US012559429B2

(12) United States Patent (10) Patent No.: US 12,559,429 B2
Levoy et al. (45) Date of Patent: Feb. 24, 2026

(54) POROUS REFRACTORY OBJECTS AND METHODS OF FORMING

(71) Applicant: SAINT-GOBAIN CERAMICS & PLASTICS, INC., Worcester, MA (US)

(72) Inventors: Nancy F. Levoy, Concord, MA (US); Allan R. Case, Worcester, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 18/394,662

(22) Filed: Dec. 22, 2023

(65) Prior Publication Data

US 2024/0217880 A1 Jul. 4, 2024

Related U.S. Application Data

(60) Provisional application No. 63/477,979, filed on Dec. 30, 2022.

(51) Int. Cl.
*C04B 35/488* (2006.01)

(52) U.S. Cl.
CPC ........ *C04B 35/488* (2013.01); *C04B 2235/32* (2013.01); *C04B 2235/3839* (2013.01); *C04B 2235/3886* (2013.01); *C04B 2235/74* (2013.01)

(58) Field of Classification Search
CPC .............. C04B 35/488; C04B 2235/32; C04B 2235/3839; C04B 2235/3886; C04B 2235/74
See application file for complete search history.

(56) References Cited

U.S. PATENT DOCUMENTS 2,341,561 A * 2/1944 Kinzie ................ C04B 38/0635
                                                                       501/83
3,255,027 A    6/1966  Talsma
4,284,121 A    8/1981  Horton
7,968,483 B2   6/2011  Djuricic et al.
8,748,855 B2   6/2014  Appleby et al.
9,284,230 B2   3/2016  Von Rymon Lipinski et al.
9,809,498 B2  11/2017  Klischat et al.
                (Continued)

FOREIGN PATENT DOCUMENTS

JP      2007290893 A    11/2007
JP      2013043811 A     3/2013
JP      2015069694 A     4/2015
                (Continued)

OTHER PUBLICATIONS https://web.archive.org/web/20170623113123/https://www.glassglobal.com/consulting/reports/technology/ Accessed Sep. 17, 2024, archived Jun. 23, 2017 Glassglobal (Year: 2017).*
                (Continued)

*Primary Examiner* — Cameron K Miller
(74) *Attorney, Agent, or Firm* — Abel Schillinger, LLP; Jermaine Lawrence

(57) ABSTRACT

A batch of refractory objects may include a plurality of bodies including a ceramic material. The batch may include an average porosity of at least 25% to not greater than 75% for the volume of the batch. The batch may have at least 50 refractory objects, a minimum volume of at least 0.36 cubic meters, and an average batch Porosity Index of not greater than 7.

16 Claims, 5 Drawing Sheets

(56)         References Cited

U.S. PATENT DOCUMENTS

| | | | |
|---|---|---|---|
| 2005/0130830 | A1 | 6/2005 | Ames et al. |
| 2014/0128242 | A1* | 5/2014 | Taniyama ........... C04B 35/6303 |
| | | | 264/43 |

FOREIGN PATENT DOCUMENTS

| | | | |
|---|---|---|---|
| KR | 20040014005 | A | 2/2004 |
| WO | 2009058330 | A1 | 5/2009 |

OTHER PUBLICATIONS

International Search Report and Written Opinion for PCT/US2023/085755, mailed on May 1, 2024, 10 pages.

\* cited by examiner

200

20KV          25x          400μm          1457

210                                                      204
204
202
202

20KV          100x          100μm          1460

220                                                      202
202
209                                                      208
208
204

20KV          25x          400μm          1452

230                                                      204
202
202
208
208
204

20KV          50x          200μm          1456

400
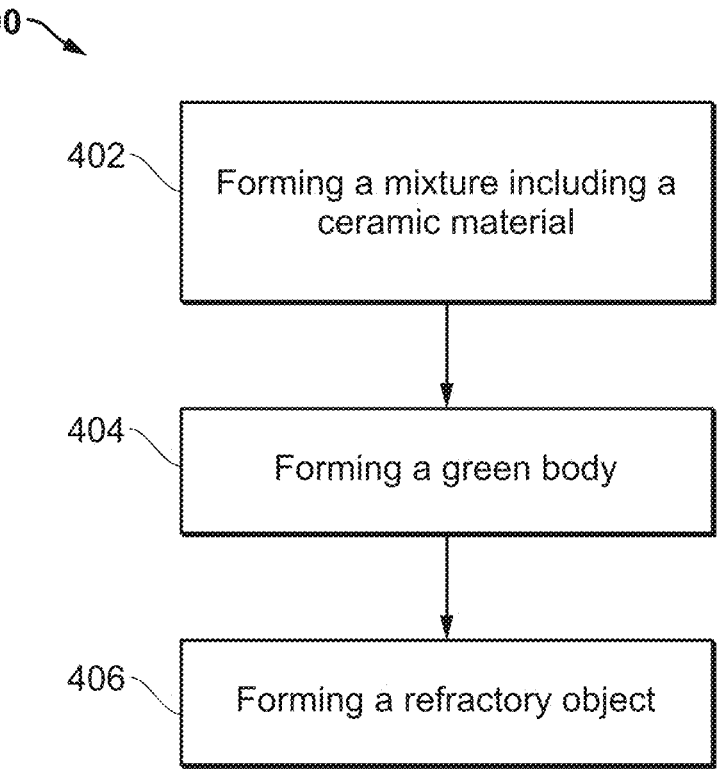
402 — Forming a mixture including a ceramic material
404 — Forming a green body
406 — Forming a refractory object
FIG. 4
500
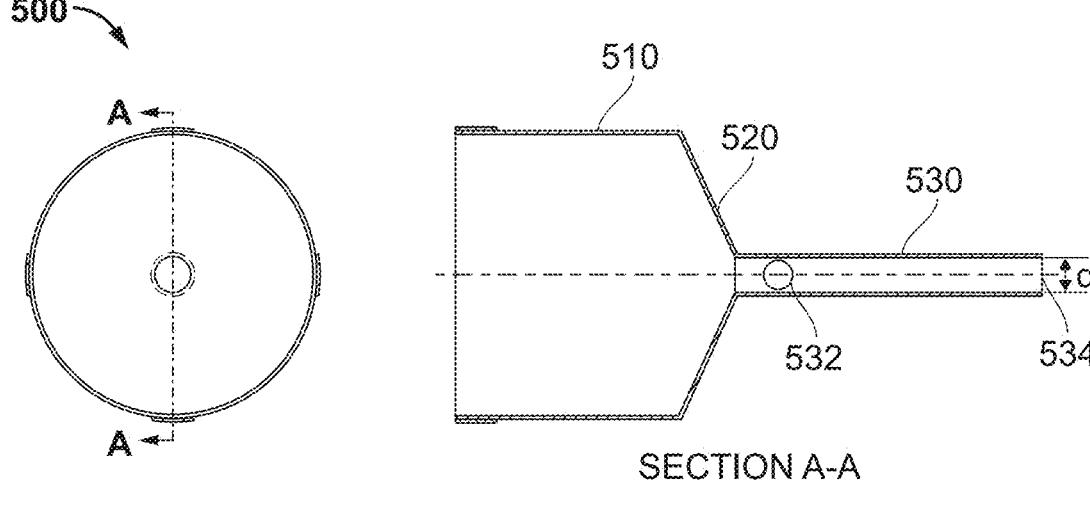
FIG. 5A                FIG. 5B
SECTION A-A

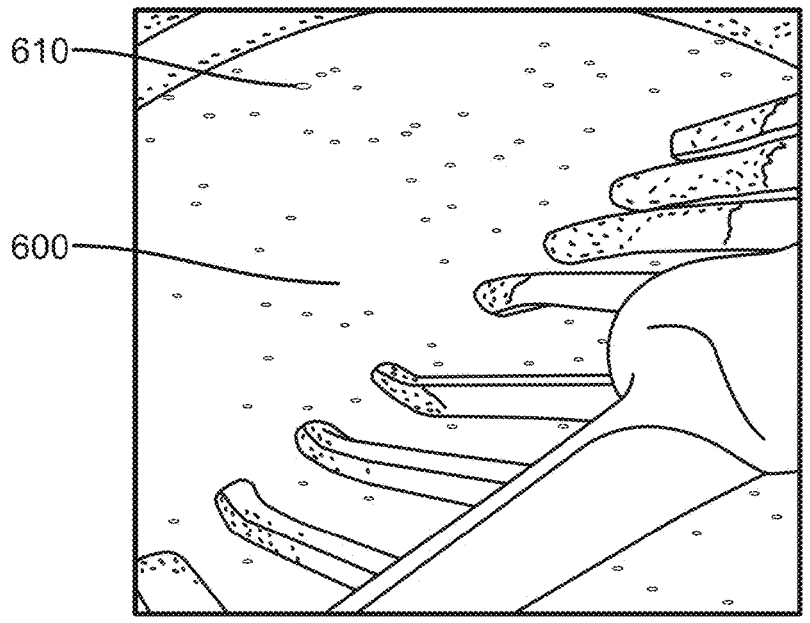
FIG. 6
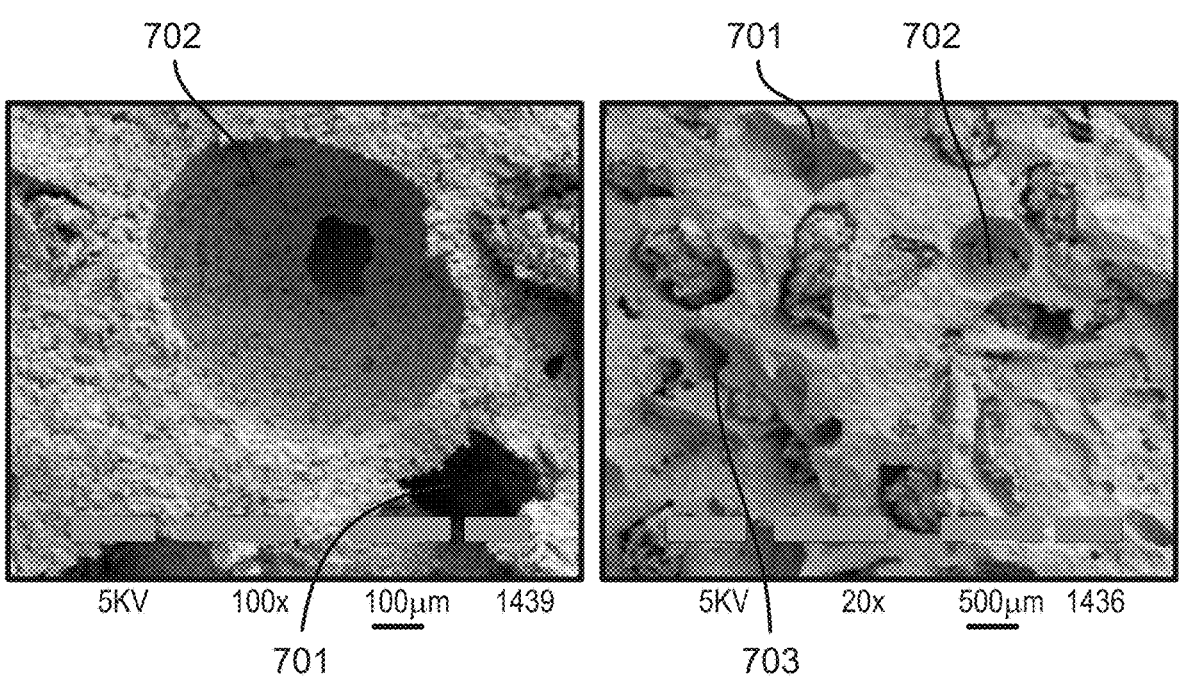
FIG. 7A          FIG. 7B

POROUS REFRACTORY OBJECTS AND METHODS OF FORMING

CROSS-REFERENCE TO RELATED APPLICATION(S)

This application claims priority under 35 U.S.C. § 119(e) to U.S. Provisional Application No. 63/477,979, entitled "POROUS REFRACTORY OBJECTS AND METHODS OF FORMING," by Nancy F. LEVOY et al., filed Dec. 30, 2022, which is assigned to the current assignee hereof and incorporated herein by reference in its entirety.

BACKGROUND OF THE INVENTION

The following is directed to porous refractory objects and methods of forming the same, and in particular, to a batch of porous refractory objects and methods of forming the same.

DESCRIPTION OF THE RELATED ART

Porous zircon bricks are used to line reactors for production of high purity optical glass. Pores having desirable sizes may be formed using pore formers. Larger voids formed unintentionally may be undesirable since they may collect molten glass that can drip onto the glass boule during use in glass manufacture. The industry continues to seek improved porous zircon bricks.

BRIEF DESCRIPTION OF THE DRAWINGS

The present disclosure may be better understood, and its numerous features and advantages made apparent to those skilled in the art by referencing the accompanying drawings.

FIG. 4 includes a flow chart illustrating a process in accordance with embodiments herein.

FIGS. 5A and 5B includes illustrations of top and cut views of an apparatus accordance with embodiments herein.

FIG. 6 includes an image of a mixture.

FIGS. 7A and 7B include SEM images of fractured surfaces of refractory objects.

Figures 1, 2A, 2B, 2C, 2D:
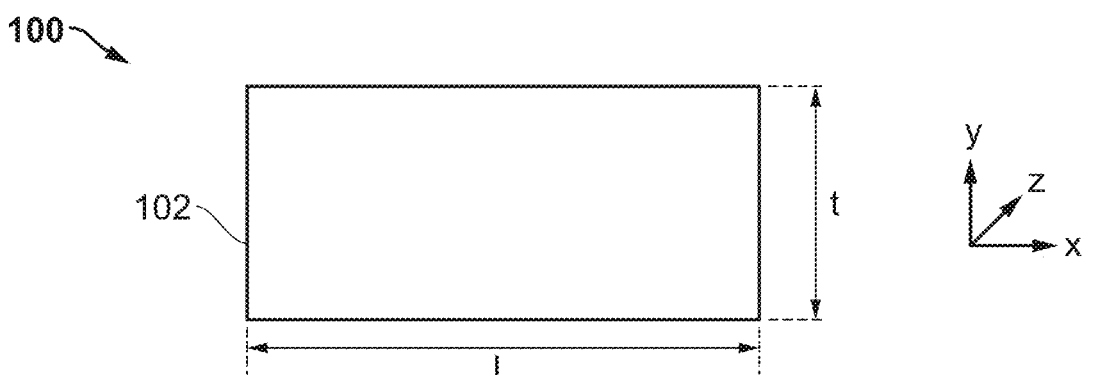
FIG. 1 includes an illustration of a perspective view of a body of a refractory object according to an embodiment.
FIGS. 2A-2D include SEM images of bodies of refractory objects.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one, and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to refractory objects, wherein the bodies of the refractory objects may include a ceramic material and porosity. In particular, embodiments relate to a batch of refractory objects that may have improved consistency in the microstructure, one or more properties, and/or performance. In a more particular embodiment, the bodies of the refractory objects may include an improved microstructure, such as controlled porosity, a particular Porosity Index, or both. For example, the refractory objects may have a reduced content of certain larger voids that may be undesirable for certain applications of the refractory objects, where larger voids may adversely affect performance of the refractory objects. The refractory objects may have improved property and/or performance. For example, the refractory objects may have improved one or more mechanical and/or thermal properties including modulus of rupture, modulus of elasticity, thermal shock resistance, or any combination thereof. The refractory objects may be suitable for applications involving high temperature, erosive conditions, thermal shocks, or the like, or any combination thereof. A particular exemplary application may include liners for reactors, such as reactors for high purity optical glass production.

Embodiments relate to methods of forming the refractory objects. The method may include controlling the pressure during mixing raw materials for forming the refractory objects. The method may allow formation of a batch of the refractory objects with improved microstructures, properties, performance, or any combination thereof. The method may facilitate improved consistency in microstructure, property, and/or performance of the refractory objects within the batch and/or between batches.

In an embodiment, a batch of refractory objects may include a plurality of bodies, wherein the batch comprises at least 50 refractory objects. Referring now to FIG. 1, a perspective view of an exemplary refractory object 100 is illustrated. In an embodiment, the refractory object 100 may take the form of a brick. As illustrated, the refractory object 100 may include a body of 102 including a length, L, extending in the x-axis, a thickness, t, extending in the y-axis, and a width extending in the z-axis. It is to be appreciated that the refractory object may be in a shape different from the illustrated. For example, the refractory object 100 may be cuboid, cylindrical, cubic, in another geometric shape, in an irregular shape, or any combination thereof. The shape of the refractory objects may be selected as desired by applications.

In an aspect, the batch may include at least 60, at least 65, at least 70, at least 80, at least 90, at least 100, at least 200, at least 300, at least 400, at least 500, at least 600, at least 700, at least 800, at least 900, or at least 1000 refractory objects. In a further aspect, the batch may include not greater than 10,000 refractory objects, such as not greater than 5000 or not greater than 2000 refractory objects. Moreover, the batch may include any number of the refractory objects in a range including any of the minimum and maximum values noted herein.

In another aspect, the batch may include a minimum volume of at least 0.36 cubic meters, such as at least 0.40 cubic meters, at least 0.42 cubic meters, at least 0.45 cubic meters, at least 0.47 cubic meters, at least 0.50 cubic meters, at least 0.52 cubic meters, at least 0.55 cubic meters, at least 0.57 cubic meters, at least 0.60 cubic meters, at least 0.64 cubic meters, at least 0.68 cubic meters, at least 0.70 cubic meters, at least 0.80 cubic meters, at least 0.9 cubic meters, at least 1.0 cubic meters, at least 1.15 cubic meters, at least 1.25 cubic meters, at least 1.35 cubic meters, at least 1.45 cubic meters, or at least 1.55 cubic meters. In another aspect, the batch may include a maximum volume of not greater than 200 cubic meters, such as not greater than 150 cubic meters, not greater than 100 cubic meters, not greater than 80 cubic meters, not greater than 50 cubic meters, not greater than 30 cubic meters, not greater than 10 cubic meters, not greater than 5 cubic meters, not greater than 4.82 cubic meters, not greater than 4.55 cubic meters, not greater than 4.10 cubic meters, not greater than 3.56 cubic meters, not greater than 3.26 cubic meters, not greater than 3.00 cubic meters, not greater than 2.55 cubic meters, not greater than 2.25 cubic meters, not greater than 2.00 cubic meters, not greater than 1.65 cubic meters, not greater than 1.25 cubic meters, not greater than 1 cubic meters, not greater than 0.85 cubic meters, or not greater than 0.6 cubic meters. Moreover, the batch may include a volume of the refractory objects in a range including any of the minimum and maximum values noted herein.

In an embodiment, the bodies of refractory objects may include a ceramic material. In another embodiment, the bodies of refractory objects may include a crystalline phase, such as a monocrystalline and/or polycrystalline phase, a vitreous phase, or a combination thereof. In an embodiment, the bodies may include a ceramic material including an oxide, a nitride, a carbide, or any combination thereof. In a particular example, the bodies may include zirconium oxide, zircon, silica, alumina, titania, chromia, tin oxide, or any combination thereof. In certain embodiments, the bodies of refractory objects may include an oxide. In further embodiments, the body of each refractory object of the batch may include an oxide. In a particular embodiment, the batch may comprise an average content of oxide that may be determined by adding up the content of the oxide for each body and dividing the total by the number of the refractory objects of the batch. The content of the oxide for each body may be in weight percentage relative to the weight of the respective body. In an aspect, the batch may include the average content of the oxide of at least 60 wt. %, such as at least 65 wt. %, at least 70 wt. %, at least 75 wt. %, at least 80 wt. %, at least 85 wt. %, at least 90 wt. %, or at least 95 wt. %. In another aspect, the batch may comprise an average content of the oxide of not greater than 99 wt. %, such as not greater than 95 wt. %, not greater than 90 wt. %, not greater than 85 wt. %, not greater than 80 wt. %, not greater than 75 wt. %, not greater than 70 wt. %, or not greater than 65 wt. %. Moreover, the batch may include an average content of oxide in a range including any of the minimum and maximum percentages noted herein.

In another aspect, each body of refractory objects of the batch may comprises at least 60 wt. % of oxide, such as at least 65 wt. %, at least 70 wt. %, at least 75 wt. %, at least 80 wt. %, at least 85 wt. %, at least 90 wt. %, or at least 95 wt. % of oxide for the weight of the respective body. In a further aspect, each body may comprise a content of the oxide of not greater than 99 wt. %, such as not greater than 95 wt. %, not greater than 90 wt. %, not greater than 85 wt. %, not greater than 80 wt. %, not greater than 75 wt. %, not greater than 70 wt. %, not greater than 65 wt. %, or another greater than 60 wt. % for the weight of the respective body. Moreover, each body may include a content of oxide in a range including any of the minimum and maximum percentages noted herein.

In an embodiment, the bodies of refractory objects may include zircon, zirconia, silica, or any combination thereof. In a particular embodiment, the bodies of refractory objects may include zircon. In another particular embodiment, the bodies of refractory objects may include a crystalline phase including zircon. In a more particular embodiment, the body of each refractory object of the batch may comprise zircon in a crystalline phase.

In an embodiment, the batch may include an average content of zircon that may facilitate improved property and/or performance of the batch. The average content of zircon may be determined by adding up the content of zircon for each body and dividing the total by the number of the refractory objects of the batch. In an aspect, the average content of zircon may be at least 60 wt. %, such as at least 65 wt. %, at least 70 wt. %, at least 75 wt. %, at least 80 wt. %, at least 85 wt. %, at least 90 wt. %, or at least 95 wt. %. In another aspect, the batch may comprise an average content of zircon of not greater than 99 wt. %, such as not greater than 95 wt. %, not greater than 90 wt. %, not greater than 85 wt. %, not greater than 80 wt. %, not greater than 75 wt. %, or not greater than 70 wt. %. Moreover, the batch may include an average content of zircon in a range including any of the minimum and maximum percentages noted herein.

In an embodiment, each body of the plurality of bodies may include a particular content of zircon that may facilitate improved property and/or performance of the batch. In an aspect, each body may include at least 60 wt. % of zircon for the respective weight of the body, such as, at least 65 wt. %, at least 70 wt. %, at least 75 wt. %, at least 80 wt. %, at least 85 wt. %, at least 90 wt. %, or at least 95 wt. % of zircon for the weight of the respective body. In a further aspect, each body may comprise a content of zircon of not greater than 99 wt. %, such as not greater than 95 wt. %, not greater than 90 wt. %, not greater than 85 wt. %, not greater than 80 wt. %, not greater than 75 wt. %, or not greater than 70 wt. % for the weight of the respective body. Moreover, each body may include the content of zircon in a range including any of the minimum and maximum percentages noted herein.

In an embodiment, the batch may include an average content of zirconia that may facilitate improved property and/or performance of the batch. The average content of zirconia may be determined by adding up the content of zirconia for each body and dividing the total by the number of the refractory objects of the batch. In an aspect, the average content of zirconia may be at least 0.5 wt. %, such as at least 1 wt. %, at least 2 wt. %, at least 3 wt. %, at least 5 wt. %, at least 6 wt. %, at least 8 wt. %, or at least 10 wt. %. In another aspect, the batch may comprise an average content of zirconia of not greater than 15 wt. %, such as not greater than 12 wt. %, not greater than 10 wt. %, not greater than 8 wt. %, not greater than 7 wt. %, not greater than 6 wt. %, not greater than 5 wt. %, or not greater than 2 wt. %. Moreover, the batch may include an average content of zirconia in a range including any of the minimum and maximum percentages noted herein.

In an embodiment, at least some or each of the bodies may include a content of zirconia. In an aspect, the content of zirconia may be at least 0.5 wt. %, such as at least 1 wt. %, at least 2 wt. %, at least 3 wt. %, at least 5 wt. %, at least 6 wt. %, at least 8 wt. %, or at least 10 wt. % for the weight of the respective body. In another aspect, the content of zirconia may be not greater than 15 wt. %, such as not greater than 12 wt. %, not greater than 10 wt. %, not greater than 8 wt. %, not greater than 7 wt. %, not greater than 6 wt. %, or not greater than 5 wt. % for the weight of the respective body. Moreover, the content of zirconia may be in a range including any of the minimum and maximum percentages noted herein.

In an embodiment, the batch may include an average content of silica that may facilitate improved property and/or performance of the batch. The average content of silica may be determined by adding up the content of silica for each body and dividing the total by the number of the refractory objects of the batch. In an aspect, the average content of silica may be at least 0.5 wt. %, such as at least 1 wt. %, at least 2 wt. %, at least 3 wt. %, at least 5 wt. %, at least 6 wt. %, at least 7 wt. %, or at least 9 wt. %. In another aspect, the batch may comprise an average content of silica of not greater than 13 wt. %, such as not greater than 12 wt. %, not greater than 10 wt. %, not greater than 8 wt. %, not greater than 7 wt. %, not greater than 6 wt. %, not greater than 5 wt. %, or not greater than 2 wt. %. Moreover, the batch may include an average content of silica in a range including any of the minimum and maximum percentages noted herein.

In an embodiment, at least some or each of the bodies may include a content of silica. In an aspect, the content of silica may be at least 0.5 wt. %, such as at least 1 wt. %, at least 2 wt. %, at least 3 wt. %, at least 4 wt. %, at least 5 wt. %, at least 7 wt. %, or at least 8 wt. % for the weight of the respective body. In another aspect, the content of silica may be not greater than 13 wt. %, such as not greater than 12 wt. %, not greater than 10 wt. %, not greater than 8 wt. %, not greater than 7 wt. %, not greater than 6 wt. %, or not greater than 5 wt. % for the weight of the respective body. Moreover, the content of silica may be in a range including any of the minimum and maximum percentages noted herein.

In a further embodiment, the bodies of refractory articles of the batch may include zircon and at least one of zirconia and silica. In a particular embodiment, the bodies of refractory articles of the batch may consist essentially of oxide.

In a further embodiment, the bodies of refractory articles may include grains of a ceramic material. For example, the bodies may include grains including an oxide, a nitride, a carbide, or any combination thereof. In a particular example, the bodies may include grains including zircon, zirconia, silica, or any combination thereof.

In a further embodiment, the bodies of refractory objects may include grains having grain sizes from 2 microns to 2 mm. In a further embodiment, the batch of refractory objects may include a particular average grain size that may facilitate improved property and/or performance of the batch. The average grain size for the batch may be calculated by adding the average grain size (D50) of each body and dividing the total by the number of the bodies of the batch. For example, the batch may include an average grain size of at least 5 microns, such as at least 10 microns, at least 15 microns, at least 30 microns, at least 40 microns, or at least 100 microns. In another example, the batch may include an average grain size of not greater than 1.5 mm, such as not greater than 1.2 mm, not greater than 1 mm, not greater than 800 microns, not greater than 700 microns, not greater than 600 microns, not greater than 500 microns, not greater than 350 microns, not greater than 200 microns, or not greater than 100 microns. Moreover, the batch may include an average grain size in a range including any of the minimum and maximum values noted herein.

In an embodiment, each refractory object of the batch may include a porous body. In a further embodiment, the batch may include a particular average porosity that may facilitate improved performance and/or properties of the batch of refractory objects. In an aspect, the batch may include an average porosity of at least 25% for the volume of the batch, such as at least 30%, at least 35%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 60%, at least 65%, or at least 70% for the volume of the batch. In another aspect, the batch may include an average porosity of not greater than 75% for the volume of the batch, such as not greater than 70%, not greater than 65%, not greater than 64%, not greater than 63%, not greater than 62%, not greater than 61%, not greater than 60%, not greater than 59%, not greater than 58%, not greater than 57%, not greater than 56%, not greater than 55%, not greater than 54%, not greater than 53%, not greater than 52%, not greater than 51%, not greater than 50%, not greater than 45%, not greater than 40%, not greater than 35%, or not greater than 30% for the volume of the batch. Moreover, the batch may include an average porosity in a range including any of the minimum and maximum percentages noted herein. As used herein, the average porosity is intended to refer to the average of porosity of each body within the batch. It may be calculated by adding up the porosity of each body and dividing the total by the number of bodies.

In an embodiment, each body of the batch of refractory objects may include a particular porosity that may facilitate improved performance and/or properties of the batch of refractory objects. In an aspect, each body may include porosity of at least 25% for the volume of the respective body, such as at least 30%, at least 35%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 60%, at least 65%, or at least 70% for the volume of the respective body. In another aspect, each body may include the porosity of not greater than 75% for the volume of the batch, such as not greater than 70%, not greater than 65%, not greater than 64%, not greater than 63%, not greater than 62%, not greater than 61%, not greater than 60%, not greater than 59%, not greater than 58%, not greater than 57%, not greater than 56%, not greater than 55%, not greater than 54%, not greater than 53%, not greater than 52%, not greater than 51%, not greater than 50%, not greater than 45%, not greater than 40%, not greater than 35%, or not greater than 30% for the volume of the respective body. Moreover, each body may include the porosity in a range including any of the minimum and maximum percentages noted herein. In a further embodiment, the porosity of each body may be used to determine the average porosity of the batch. For example, the average porosity of the batch may be calculated by adding up the porosity of all the bodies and dividing the total by the number of the refractory objects.

In an embodiment, porosity of the batch of refractory objects may include a particular type of pores. In a particular embodiment, each body of the batch may include a first type of pores. In an aspect, the first type of pores may include an irregular angular shape. In a further aspect, the first type of pores may be engineered. In an instance, the first type of pores may be formed by using pore formers, such as corks or another material. Referring now to FIGS. 2A-2B, images of bodies of refractory objects of a representative batch are included. The bodies 200 and 210 may include the first type of pores 202 having irregular angular shapes. In a further embodiment, the first type of pore may have a homogenous distribution.

In an embodiment, the batch may comprise a particular average content of the first pore type of pores that may facilitate improved property and/or performance of the batch of refractory object. In an aspect, the batch may include an average content of the first type of pores of at least 23 vol % for the volume of the batch, such as at least 25 vol %, at least 27 vol %, at least 30 vol %, at least 32 vol %, at least 35 vol %, or at least 37 vol % for the volume of the batch. In another aspect, the batch may comprise the average content of the first type of pores of not greater than 41 vol % % for the volume of the batch, such as not greater than 39 vol %, not greater than 37 vol %, not greater than 35 vol %, not greater than 33 vol %, or not greater than 31 vol % for the volume of the batch. Moreover, the batch may include an average content of the first type of pores in a range including any of the minimum and maximum percentages noted herein.

In an embodiment, each body may comprise a particular content of the first type of pores that may facilitate improved property and/or performance of the batch of refractory object. In an aspect, each body may include at least 23 vol % of the first type of pores for the volume of the respective body, such as at least 25 vol %, at least 27 vol %, at least 30 vol %, at least 32 vol %, at least 35 vol %, or at least 37 vol % of the first type of pores for the volume of the respective body. In another aspect, each body may comprise the content of the first type of pores of not greater than 41 vol % for the volume of the respective body, such as not greater than 39 vol %, not greater than 37 vol %, not greater than 35 vol %, not greater than 33 vol %, or not greater than 31 vol % for the volume of the respective body. Moreover, each body may include an average content of the first type of pores in a range including any of the minimum and maximum percentages noted herein.

Figure 3:
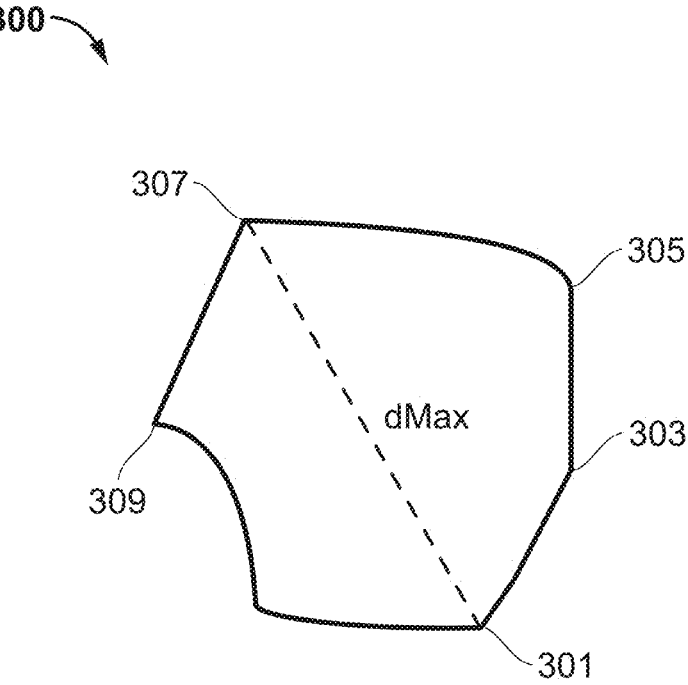
FIG. 3 includes an illustration of a type of pore in accordance with embodiments herein.

In an embodiment, the first type of pores may comprise a particular average maximum dimension that may facilitate improved property and/or performance of the batch. In a further embodiment, each body of the batch of refractory objects may include the first type of pores including an average maximum dimension. The average maximum dimension of the first type of pores of each body may be determined by measuring at least 5 randomly selected different pores from each of at least 3 different cross-sectional SEM images of a body. The average of the longest linear distances of all the measured pores may be the average maximum dimension of the first type of pores for the body. Referring to FIG. 3, an exemplary pore of the first type is illustrated including apexes 301 to 309. The linear distance between the apexes 301 and 307 may be the longest between any two apexes of 301 to 309 and may be the maximum dimension, $d_{Max}$, of pore 300.

In another embodiment, the batch may include a particular average maximum dimension of the first type of pores that may facilitate improved property and/or performance of the batch and may be determined by adding up the average maximum dimension of the first type of pores of each body and dividing the total by the number of the bodies. In an aspect, the batch may include an average maximum dimension of the first type of pores of at least 0.01 mm, at least 0.03 mm, at least 0.05 mm, at least 0.08 mm, at least 0.1 mm, at least 0.2 mm, at least 0.3 mm, at least 0.5 mm, at least 0.7 mm, at least 0.9 mm, at least 1.1 mm, at least 1.3 mm, at least 1.5 mm, at least 1.7 mm, or at least 1.9 mm. In another aspect, the batch may include the average maximum dimension of the first type of pores of less than 3 mm, less than 2.5 mm, less than 2 mm, not greater than 1.8 mm, not greater than 1.6 mm, not greater than 1.4 mm, not greater than 1.2 mm, not greater than 1 mm, not greater than 800 microns, not greater than 650 microns, not greater than 500 microns, not greater than 380 microns, not greater than 250 microns, not greater than 125 microns, not greater than 100 microns, not greater than 75 microns, not greater than 50 microns, not greater than 25 microns, or not greater than 10 microns. Moreover, the batch may include the average maximum dimension of the first type of pores in a range including any of the minimum and maximum values noted herein.

In another embodiment, each body of the batch of refractory objects may include a particular average maximum dimension of the first type of pores that may facilitate improved property and/or performance of the batch. In an aspect, each body may include the first type of pores having an average maximum dimension of at least 0.01 mm, at least 0.03 mm, at least 0.05 mm, at least 0.08 mm, at least 0.1 mm, at least 0.2 mm, at least 0.3 mm, at least 0.5 mm, at least 0.7 mm, at least 0.9 mm, at least 1.1 mm, at least 1.3 mm, at least 1.5 mm, at least 1.7 mm, or at least 1.9 mm. In another aspect, each body of the batch of refractory objects may include the average maximum dimension of the first type of pores of less than 3 mm, less than 2.5 mm, less than 2 mm, not greater than 1.8 mm, not greater than 1.6 mm, not greater than 1.4 mm, not greater than 1.2 mm, not greater than 1 mm, not greater than 800 microns, not greater than 650 microns, not greater than 500 microns, not greater than 380 microns, not greater than 250 microns, not greater than 125 microns, not greater than 100 microns, not greater than 75 microns, not greater than 50 microns, not greater than 25 microns, or not greater than 10 microns. Moreover, each body of the batch may include the average maximum dimension of the first type of pores in a range including any of the minimum and maximum values noted herein.

In an embodiment, the batch may include a particular content of the first type of pores relative to the total porosity (vol %) of the batch that may facilitate improved property and/or performance of the batch. In an aspect, at least 40% of the total porosity may include the first type of pores, such as at least 44%, at least 47%, at least 50%, at least 52%, at least 55%, at least 57%, at least 59%, at least 61%, at least 64%, at least 66%, at least 68%, at least 70%, or at least 73% of the total porosity of the batch may include the first type of pores. In another aspect, not greater than 79% of the total porosity may include the first type of pores, such as not greater than 77%, not greater than 74%, not greater than 71%, not greater than 68%, not greater than 66%, not greater than 64%, not greater than 61%, not greater than 58%, not greater than 54%, not greater than 51%, not greater than 49%, not greater than 47%, or not greater than 45% of the total porosity of the batch may include the first type of pores. Moreover, the batch may include the content of the first type of pores relative to the total porosity in a range including any of the minimum and maximum percentages noted herein.

In an embodiment, each body of the batch of refractory objects may include a particular content of the first type of pores relative to the porosity of the respective body (vol %) that may facilitate improved property and/or performance of the batch. In an aspect, at least 40% of the porosity of each body may include the first type of pores, such as at least 44%, at least 47%, at least 50%, at least 52%, at least 55%, at least 57%, at least 59%, at least 61%, at least 64%, at least 66%, at least 68%, at least 70%, or at least 73% of the porosity of each body may include the first type of pores. In another aspect, not greater than 79% of the porosity of each body may include the first type of pores, such as not greater than 77%, not greater than 74%, not greater than 71%, not greater than 68%, not greater than 66%, not greater than 64%, not greater than 61%, not greater than 58%, not greater than 54%, not greater than 51%, not greater than 49%, not greater than 47%, or not greater than 45% of the porosity of each body may include the first type of pores. Moreover, each body may include the content of the first type of pores relative to the porosity of the respective body in a range including any of the minimum and maximum percentages noted herein.

In an embodiment, each body of the batch may include a second type of pores. In an aspect, the second type of pores may be in reference to voids or spaces between grains. In a further aspect, the second type of pores may form baseline porosity of each body. In a further embodiment, the second type of pores may have a homogenous distribution through each body.

In a further embodiment, the second type of pores may include an irregular shape, a regular shape, or any combination thereof. In another embodiment, the second type of pores may have a shape defined by the shapes of grains. FIG. 2B includes an SEM image of a portion of the body 210 of a representative refractory object at a higher magnification compared to FIG. 2A. The body 210 may include the first type of pores 202 and the second type of pores 204. As illustrated in FIGS. 2A and 2B, the bodies 200 and 210 may include porosity that may consist essentially of baseline porosity including pores 204 that may be results from spaces between the grains and the first type of pores that may be engineered pores by using a suitable pore former.

In an embodiment, the second type of pores may include pore sizes not greater than the average maximum dimension of the first type of pores. In an aspect, each body of the batch of refractory objects may include the second type of pores including an average maximum dimension less than the average maximum dimension of the first type of pores. The maximum dimension of a second type of pore or the average maximum dimension of the second type of pores may be determined in the same manner as the maximum dimension or the average maximum dimension of the first type of pores, respectively. In a further aspect, each body of the batch of refractory objects may include the second type of pores having an average pore size less than the average maximum dimension of the first type of pores.

In a particular embodiment, the batch may include the second type of pores including an average pore size not greater than 90% of the average maximum dimension of the first type of pores, such as not greater than 85%, not greater than 80%, not greater than 70%, not greater than 60%, not greater than 50%, not greater than 40%, not greater than 30%, not greater than 20%, not greater than 10%, or not greater than 5% of the average maximum dimension of the first type of pores. Additionally or alternatively, the batch may include the second type of pores including an average pore size of at least 0.1% of the average maximum dimension of the first type of pores, such as at least 0.5%, at least 1%, at least 5%, at least 7%, at least 10%, at least 13%, at least 15%, at least 18%, at least 20%, at least 25%, at least 30%, at least 35%, at least 38%, at least 40%, at least 45%, or at least 50% of the average maximum dimension of the first type of pores. Moreover, the batch may include an average pore size of the second type of pores in a range including any of the minimum and maximum percentages noted herein.

In a particular embodiment, the batch may include an average maximum dimension of the second type of pores of not greater than 70% of the average maximum dimension of the first type of pores, such as not greater than 60%, not greater than 50%, not greater than 40%, not greater than 30%, not greater than 20%, not greater than 10%, not greater than 5%, or not greater than 2% of the average maximum dimension of the first type of pores. Additionally or alternatively, the batch may include the average maximum dimension of the second type of pores of at least 0.1% of the average maximum dimension of the first type of pores, such as at least 0.5%, at least 1%, at least 5%, at least 7%, at least 10%, at least 13%, at least 15%, at least 18%, at least 20%, at least 25%, at least 30%, at least 35%, at least 38%, at least 40%, at least 45%, at least 50%, or at least 60% of the average maximum dimension of the first type of pores. Moreover, the batch may include an average maximum dimension of the second type of pores in a range including any of the minimum and maximum percentages noted herein.

In an embodiment, each body of the batch of refractory objects may include an average pore size of the second type of pores of not greater than 60% of the average maximum dimension of the first type of pores, such as not greater than 50%, not greater than 40%, not greater than 30%, not greater than 20%, not greater than 10%, or not greater than 5% of the average maximum dimension of the first type of pores. Additionally or alternatively, each body of the batch may include the average pore size of the second type of pores of at least 0.1% of the average maximum dimension of the first type of pores, such as at least 0.5%, at least 2%, at least 5%, at least 7%, at least 10%, at least 13%, at least 15%, at least 18%, at least 20%, at least 25%, at least 30%, at least 35%, at least 38%, at least 40%, at least 45%, or at least 50% of the average maximum dimension of the first type of pores. Moreover, each body may include an average pore size of the second type of pores in a range including any of the minimum and maximum values noted herein.

In a particular embodiment, each body of the batch may include an average maximum dimension of the second type of pores of not greater than 70% of the average maximum dimension of the first type of pores, such as not greater than 60%, not greater than 50%, not greater than 40%, not greater than 30%, not greater than 20%, not greater than 10%, not greater than 5%, or not greater than 2% of the average maximum dimension of the first type of pores. Additionally or alternatively, each body of the batch may include the average maximum dimension of the second type of pores of at least 0.1% of the average maximum dimension of the first type of pores, such as at least 0.5%, at least 1%, at least 5%, at least 7%, at least 10%, at least 13%, at least 15%, at least 18%, at least 20%, at least 25%, at least 30%, at least 35%, at least 38%, at least 40%, at least 45%, at least 50%, or at least 60% of the average maximum dimension of the first type of pores. Moreover, each body of the batch may include an average maximum dimension of the second type of pores in a range including any of the minimum and maximum values noted herein.

In an embodiment, the batch may comprise a particular average content of the second type of pores that may facilitate improved property and/or performance of the batch of refractory object. In an aspect, the first type of pores may be in a greater content compared to the content of the second type of pores. In a further aspect, the batch may include an average content of the second type of pores of at least 12 vol %, such as at least 15 vol %, at least 17 vol %, at least 20 vol %, or at least 22 vol % for the volume of the batch. In another aspect, the batch may comprise the average content of the second pore type of not greater than 26 vol % for the volume of the batch, such as not greater than 26 vol %, not greater than 24 vol %, not greater than 22 vol %, not greater than 20 vol %, not greater than 18 vol %, or not greater than 16 vol % for the volume of the batch. Moreover, the batch may include an average content of the second type of pores in a range including any of the minimum and maximum percentages noted herein.

In an embodiment, each body of the batch of the refractory objects may comprise a particular content of the second type of pores that may facilitate improved property and/or performance of the batch of refractory object. In an aspect, each body may include a content of the second type of pores of at least 12 vol %, such as at least 15 vol %, at least 17 vol %, at least 20 vol %, or at least 22 vol % for the volume of the respective body. In another aspect, each body may comprise the content of the second pore type of not greater than 26 vol % for the volume of the batch, such as not greater than 26 vol %, not greater than 24 vol %, not greater than 22 vol %, not greater than 20 vol %, not greater than 18 vol %, or not greater than 16 vol % for the volume of the respective body. Moreover, each body of the batch of refractory objects may include a content of the second type of pores in a range including any of the minimum and maximum percentages noted herein.

In an embodiment, the batch may include a particular content of the second type of pores relative to the total porosity of the batch (vol %) that may facilitate improved property and/or performance of the batch. In an aspect, not greater than 45% of the total porosity may include the second type of pores, such as not greater than 43%, not greater than 41%, not greater than 38%, not greater than 35%, not greater than 33%, not greater than 31%, not greater than 28%, not greater than 26%, not greater than 23%, not greater than 21%, not greater than 19%, not greater than 15% of the total porosity of the batch may include the second type of pores. In another aspect, at least 24% of the total porosity may include the second type of pores, such as at least at least 27%, at least 30%, at least 32%, at least 35%, at least 37%, at least 39%, or at least 41% of the total porosity of the batch may include the second type of pores. Moreover, the batch may include the content of the second type of pores relative to the total porosity in a range including any of the minimum and maximum percentages noted herein.

In an embodiment, each body of the batch of refractory objects may include a particular content of the second type of pores relative to the porosity of the respective body (vol %) that may facilitate improved property and/or performance of the batch. In an aspect, not greater than 45% of the porosity of each body may include the second type of pores, such as not greater than 43%, not greater than 41%, not greater than 38%, not greater than 35%, not greater than 33%, not greater than 31%, not greater than 28%, not greater than 26%, not greater than 23%, not greater than 21%, not greater than 19%, not greater than 15% of the porosity of each body may include the second type of pores. In another aspect, at least 24% of the porosity of each body may include the second type of pores, such as at least at least 27%, at least 30%, at least 32%, at least 35%, at least 37%, at least 39%, or at least 41% of the porosity of each body may include the second type of pores. Moreover, each body may include the content of the second type of pores relative to the porosity of the respective body in a range including any of the minimum and maximum percentages noted herein.

Referring now to FIGS. 2C and 2D, microscopic images of the bodies 220 and 230 of refractory objects are included. The bodies 220 and 230 may include the first type of pores 202, the second type of pores 204, and a third type of pores 208 and 210. The third type of pores 208 and 209 may have a regular shape or substantially rounded shapes. The bodies of refractory objects 220 and 230 may be formed in a different manner than the bodies of representative refractory objects 200 and 210 illustrated in FIGS. 2A-2B. The third type of pores 208 and 209 may be resulted from bubbles formed during the forming process.

In certain instances, the third type of pores may include pores having an average maximum dimension that may be greater than the average maximum dimension of the first type of pores, such as pores 209 illustrated in FIG. 2C. In particular instances, the average maximum dimension of the third type of pores may be the diameter of the pores. In a further example, the average maximum dimension of the third type of pores may be at least 3 mm or greater than 3 mm, such as at least 3.2 mm, at least 3.5 mm, at least 3.8 mm, at least 4.1 mm, at least 4.4 mm, at least 4.7 mm, at least 5 mm, at least 5.3 mm, at least 5.5 mm, at least 5.9 mm, at least 6.2 mm, at least 6.5 mm, at least 6.8 mm, or at least 7.1 mm. In another instance, the third type of pores may comprise pores having the maximum dimension of not greater 15 mm, not greater than 12 mm, not greater than 10 mm, not greater than 9 mm, not greater than 8.5 mm, not greater than 8 mm, not greater than 7.5 mm, not greater than 7.1 mm, not greater than 6.8 mm, not greater than 6.5 mm, not greater than 6.3 mm, not greater than 6.1 mm, not greater than 5.8 mm, not greater than 5.4 mm, not greater than 5.1 mm, or not greater than 4.8 mm. In another example, the third type of pores may include pores having the average maximum dimension in a range including any of the minimum and maximum values noted herein. The average maximum dimension of the third type of pores may be determined in the same manner as the average maximum dimension of the first type of pores.

In further instances, the third type of pores may include pores having an average maximum dimension that may be similar to or smaller than the average maximum dimension of the first type of pores, such as pores 208 illustrated in FIGS. 2C and 2D.

In an embodiment, the bodies of the batch of refractory objects may include the third type of pores in a particular content that may facilitate improved property and/or performance of the batch. In a further embodiment, the batch may include a particular average content of the third type of pores that may facilitate improved property and/or performance of the batch. In an aspect, the batch may comprise an average content of the third pore type of less than 5 vol % % for the volume of the batch, such as not greater than 4 vol %, not greater than 3 vol %, not greater than 2 vol %, not greater than 1 vol %, not greater than 0.7%, not greater than 0.5%, not greater than 0.2 vol %, or not greater than 0.1 vol % for the volume of the batch. In another aspect, the batch may comprise the average content of the third pore type of at least 0.005 vol %, such as at least 0.01 vol %, at least 0.05 vol %, at least 0.08 vol %, at least 0.1 vol %, at least 0.3 vol %, at least 0.5 vol %, at least 0.7 vol %, at least 0.9 vol %, at least 1 vol %, at least 1.3 vol %, at least 1.5 vol %, at least 1.8 vol %, at least 2 vol %, at least 3 vol %, at least 4 vol %, at least 4.2 vol %, or at least 4.6 vol % for the volume of the batch. Moreover, the batch may include the average content of the third type of pores in a range including any of the minimum and maximum percentages noted herein. The average content of the third type of pores may be determined in the same manner as the first or the second type of pores.

In a further embodiment, each body of the batch of refractory objects may include a particular average content of the third type of pores that may facilitate improved property and/or performance of the batch. In an aspect, each body may comprise a content of the third pore type of less than 5 vol % % for the volume of the respective body, such as not greater than 4 vol %, not greater than 3 vol %, not greater than 2 vol %, not greater than 1 vol %, not greater than 0.7%, not greater than 0.5%, not greater than 0.2 vol %, or not greater than 0.1 vol % for the volume of the respective body. In another aspect, each body may comprise the content of the third pore type of at least 0.005 vol %, such as at least 0.01 vol %, at least 0.05 vol %, at least 0.08 vol %, at least 0.1 vol %, at least 0.3 vol %, at least 0.5 vol %, at least 0.7 vol %, at least 0.9 vol %, at least 1 vol %, at least 1.3 vol %, at least 1.5 vol %, at least 1.8 vol %, at least 2 vol %, at least 3 vol %, at least 4 vol %, at least 4.2 vol %, or at least 4.6 vol % for the volume of the respective body. Moreover, each body may include the content of the third type of pores in a range including any of the minimum and maximum percentages noted herein. The average content of the third type of pores may be determined in the same manner as the first or the second type of pores.

In an embodiment, the batch may include a particular content of the third type of pores relative to the total porosity of the batch (vol %) that may facilitate improved property and/or performance of the batch. In an aspect, not greater than 9% of the total porosity of the batch may include the third type of pores, such as not greater than 8%, not greater than 7%, not greater than 6%, not greater than 5%, not greater than 4%, not greater than 3%, not greater than 2%, not greater than 1%, not greater than 0.8%, not greater than 0.5%, not greater than 0.2%, or not greater than 0.1% of the total porosity of the batch may include the third type of pores. In a further embodiment, the batch may be essentially free of the third type of pores having a maximum dimension of at least 3 mm. In a further embodiment, the batch may be essentially free of the third type of pores.

In an embodiment, each body may include a particular content of the third type of pores relative to the porosity of the respective body (vol %) that may facilitate improved property and/or performance of the batch. In an aspect, not greater than 9% of the porosity of the respective body may include the third type of pores, such as not greater than 8%, not greater than 7%, not greater than 6%, not greater than 5%, not greater than 4%, not greater than 3%, not greater than 2%, not greater than 1%, not greater than 0.8%, not greater than 0.5%, not greater than 0.2%, or not greater than 0.1% of the porosity of the respective body may include the third type of pores. In a further embodiment, at least the majority of the batch of refractory objects may be essentially free of the third type of pores having a maximum dimension of at least 3 mm. In particular embodiments, each body of the batch may be essentially free of the third type of pores having a maximum dimension of at least 3 mm. In a further embodiment, at least the majority of the batch of the refractory objects may be essentially free of the third type of pores. In particular embodiments, each body of the batch may be essentially free of the third type of pores.

In a particular embodiment, the batch may include a particular average batch Porosity Index (PI) that may facilitate improved performance and/or properties of the batch of refractory objects. PI may be defined as [1×(number of pores of the third pore type having a pore size greater than 3 mm and not greater than or equal to 5 mm)+5×(number of pores of the third pore type having a pore size greater than 5 mm and not greater than or equal to 6.5 mm)+10×(number of pores of the third pore type having a pore size greater than 6.5 mm)]. For determining the PI of a body, at least 1-3 cut surfaces of the body may be formed. Each cut surface may measure at least 30 cm in length and at least 15 cm in width or have the surface area of at least 450 cm². The number of rounded pores having the pore sizes noted in the above formula may be determined for calculating the PI for each cut surface. The average PI of all the cut surfaces of the body may be used as the PI for the body. The average PI of the batch may be determined by adding up the PI of each body and dividing the total by the number of the bodies.

In an embodiment, the batch may comprise a particular average PI that may facilitate improved property and/or performance of the batch. In an aspect, the batch may include an average PI of not greater than 7, such as not greater than 6, not greater than 5, not greater than 4, not greater than 3, not greater than 2, not greater than 1, not greater than 0.7, not greater than 0.5, not greater than 0.3, or not greater than 0.1. In a particular aspect, the batch may include an average PI of 0. In an aspect, the batch may include an average PI of at least 0.0001, such as at least 0.0005, at least 0.0007, at least 0.001, at least 0.002, or at least 0.003. Moreover, the batch may include an average PI in a range including any of the minimum and maximum values noted herein.

In an embodiment, each body of the batch may comprise a particular PI that may facilitate improved property and/or performance of the batch. In an aspect, each body may include an average PI of not greater than 7, such as not greater than 6, not greater than 5, not greater than 4, not greater than 3, not greater than 2, not greater than 1, not greater than 0.7, not greater than 0.5, not greater than 0.3, or not greater than 0.1. In a particular aspect, a majority of the bodies may include an average PI of 0. In a more particular aspect, each body of the batch may include an average PI of 0. In an aspect, some or each of the bodies may include an average PI of at least 0.0001, such as at least 0.0005, at least 0.0007, at least 0.001, at least 0.002, or at least 0.003. Moreover, each body may include a PI in a range including any of the minimum and maximum values noted herein.

In an embodiment, the batch may include a porosity including particular pore sizes that may facilitate improved property and/or performance of the batch. In an embodiment, at least 95% of the total porosity of the batch may comprise pores having an average maximum dimension of not greater than 6.5 millimeters. For example, at least 96%, at least 97%, at least 98%, at least 99%, or even 100% of the total porosity of the batch may comprise pores having an average maximum dimension of not greater than 6.5 millimeters.

In a further embodiment, at least 90% of the total porosity of the batch may comprise pores having an average maximum dimension of not greater than 5 millimeters. For example, at least 91%, at least 92%, at least 93%, at least 94%, at least 95%, at least 96%, at least 97%, at least 98%, at least 99%, or 100% of the total porosity of the batch may comprise pores having the average maximum dimension of not greater than 5 millimeters.

In a further embodiment, at least 85% of the total porosity of the batch may comprise pores having an average maximum dimension of not greater than 3 millimeters. For example, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of the total porosity of the batch may comprise pores having the average maximum dimension of not greater than 3 millimeters. In particular instances, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of the total porosity of the batch may comprise pores having the average maximum dimension of less than 3 millimeters. In more particular instances, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of the total porosity of the batch may comprise pores having the average maximum dimension of not greater than 2 millimeters. In a particular aspect, the batch may be essentially free of pores having the average maximum dimension of at least 3 millimeters or greater than 2 millimeters.

In an embodiment, the body of each refractory object of the batch may have similar dimensions. The dimensions of the bodies may be determined to suit applications of the refractory objects. In certain applications, the refractory objects may include a body including a length of at least 10 cm, such as at least 15 cm, at least 20 cm, at least 25 cm, at least 30 cm, at least 35 cm, or at least 40 cm. Additionally or alternatively, the length may be not greater than 110 cm, such as not greater 100 cm, not greater than 90 cm, not greater than 80 cm, or not greater than 65 cm. Moreover, the length may be in a range including any of the minimum and maximum values noted herein. In particular implementations, the body of each refractory object of the batch may include substantially the same length.

In certain applications, the refractory objects may include a body including a thickness of at least 1 cm, such as at least 2 cm, at least 4 cm, at least 6 cm, at least 8 cm, or at least 10 cm. Additionally or alternatively, the thickness may be not greater than 20 cm, such as not greater 16 cm, not greater than 14 cm, not greater than 11 cm, not greater than 8 cm, or not greater than 5 cm. Moreover, the thickness may be in a range including any of the minimum and maximum values noted herein. In particular implementations, the batch of refractory objects may include substantially the same thickness.

In certain applications, the refractory objects may include a body including a width of at least 5 cm, such as at least 7 cm, at least 9 cm, at least 11 cm, at least 13 cm, or at least 15 cm. Additionally or alternatively, the width may be not greater than 36 cm, such as not greater 32 cm, not greater than 28 cm, not greater than 25 cm, not greater than 22 cm, not greater than 17 cm, or not greater than 15 cm. Moreover, the width may be in a range including any of the minimum and maximum values noted herein. In particular implementations, the batch of refractory objects may include substantially the same width.

In further applications, the batch of refractory objects may include a body having a volume of at least 3.6 cubic decimeters, at least 5.4 cubic decimeters, at least 7.2 cubic decimeters, at least 8.0 cubic decimeters, or at least 9.8 cubic decimeters. Additionally or alternatively, the volume may be not greater than 36 cubic decimeters, not greater than 24 cubic decimeters, not greater than 16 cubic decimeters, not greater than 11 cubic decimeters, not greater than 7 cubic decimeters, or not greater than 4 cubic decimeters. Moreover, the volume may be in a range including any of the minimum and maximum values noted herein. In particular implementations, the batch of refractory objects may include substantially the same volume.

The batch of refractory objects may have notably improved properties including one or more of density, modulus of elasticity, modulus of rupture, heat resistance, thermal shock resistance, or any combination thereof, comparing to a batch of refractory objects having the same composition but made using a conventional method. In an embodiment, the batch may include a particular average density that may facilitate improved performance of the batch. In an aspect, the batch may comprise an average density of at least 1.70 grams per cubic centimeter (g/cc), at least 1.75 g/cc, at least 1.80 g/cc, at least 1.85 g/cc, at least 1.90 g/cc, at least 1.95 g/cc, at least 2.00 g/cc, at least 2.05 g/cc, at least 2.10 g/cc, at least 2.15 g/cc, at least 2.20 g/cc, at least 2.25 g/cc, at least 2.30 g/cc, at least 2.35 g/cc, at least 2.40 g/cc, at least 2.45 g/cc, or at least 2.50 g/cc. In a further aspect, the batch may comprise an average density of not greater than 2.75 grams per cubic centimeter (g/cc), not greater than 2.70 g/cc, not greater than 2.65 g/cc, not greater than 2.60 g/cc, not greater than 2.55 g/cc, not greater than 2.50 g/cc, not greater than 2.45 g/cc, not greater than 2.40 g/cc, not greater than 2.35 g/cc, not greater than 2.30 g/cc, not greater than 2.25 g/cc, not greater than 2.20 g/cc, not greater than 2.15 g/cc, not greater than 2.10 g/cc, not greater than 2.05 g/cc, or not greater than 2.00 g/cc. Moreover, the batch may comprise an average density in a range including any of the minimum and maximum values noted herein.

In an embodiment, the batch may include a particular average modulus of elasticity that may facilitate improved performance of the batch. In an aspect, the batch may comprise an average modulus of rupture of at least 20 Gpa, at least 25 Gpa, at least 26 Gpa, at least 27 Gpa, at least 28 Gpa, at least 29 Gpa, at least 30 Gpa, at least 31 Gpa, at least 32 Gpa, at least 33 Gpa, at least 34 Gpa, at least 35 Gpa, or at least 36 Gpa. In a further aspect, the batch may comprise an average modulus of elasticity of not greater than 40 Gpa, not greater than 35 Gpa, not greater than 34 Gpa, not greater than 33 Gpa, not greater than 32 Gpa, not greater than 31 Gpa, not greater than 30 Gpa, not greater than 29 Gpa, not greater than 28 Gpa, not greater than 27 Gpa, not greater than 26 Gpa, or not greater than 25 Gpa. Moreover, the batch may comprise an average modulus of elasticity in a range including any of the minimum and maximum values noted herein.

In an embodiment, the batch may include a particular average modulus of rupture that may facilitate improved performance of the batch. In an aspect, the batch may comprise an average modulus of rupture of at least 10.5 Mpa, at least 10.6 Mpa, at least 10.7 Mpa, at least 10.8 Mpa, at least 10.9 Mpa, at least 11.0 Mpa, at least 11.1 Mpa, at least 11.2 Mpa, at least 11.3 Mpa, at least 11.4 Mpa, at least 11.5 Mpa, at least 11.6 Mpa, at least 11.7 Mpa, at least 11.8 Mpa, at least 11.9 Mpa, at least 12.0 Mpa, at least 12.1 Mpa, at least 12.2 Mpa, at least 12.3 Mpa, at least 12.4 Mpa, at least 12.5 Mpa, or at least 12.6 Mpa. In a further aspect, the batch may comprise an average modulus of rupture of not greater than 13.5 Mpa, not greater than 13.4 Mpa, not greater than 13.3 Mpa, not greater than 13.2 Mpa, not greater than 13.1 Mpa, not greater than 13.0 Mpa, not greater than 12.9 Mpa, not greater than 12.8 Mpa, not greater than 12.7 Mpa, not greater than 12.6 Mpa, not greater than 12.5 Mpa, not greater than 12.4 Mpa, not greater than 12.3 Mpa, not greater than 12.2 Mpa, not greater than 12.1 Mpa, or not greater than 12.0 Mpa. Moreover, the batch may comprise an average modulus of rupture in a range including any of the minimum and maximum values noted herein.

In an embodiment, the batch or a plurality of batches of refractory objects may be utilized to form a ceramic liner for an apparatus that may operate at high temperatures. In a further embodiment, a ceramic liner may include at least one batch of refractory objects of embodiments herein. In a particular application, the ceramic liner may be configured to be in contact with molten glass.

In another embodiment, an equipment may comprise an inner wall defining a cavity of the equipment, wherein the inner wall may be lined with at least one batch of the refractory objects, wherein the equipment may be configured to operate at a temperature of at least 1500° C., at least 1700° C., at least 1900° C., or at least 2200° C. In exemplary applications, the equipment may comprise a furnace, a reactor, or any combination thereof.

FIG. 4 includes a flow chart illustrating a process 400 for forming a batch of refractory objects. The process 400 may start at block 402 forming a mixture of raw materials. The mixture may include a ceramic material, an amorphous material, or a combination thereof. In an embodiment, the mixture may include a ceramic material. In another embodiment, the mixture may include an oxide, a nitride, a carbide, or any combination thereof. In a particular embodiment, the mixture may include one or more oxides. A particular example of oxide may include zirconium oxide, zircon, alumina, titania, chromia, tin oxide, silica, or any combination thereof.

In a particular embodiment, the mixture may include at least 40 wt. % of the ceramic material for a total weight of the mixture, such as at least 45 wt. %, at least 55 wt. %, at least 60 wt. %, at least 65 wt. %, at least 70 wt. %, at least 75 wt. %, at least 80 wt. %, at least 85 wt. %, or at least 90 wt. % for a total weight of the mixture. In another example, the mixture may include not greater than 99 wt. % of the ceramic material for the total weight of the mixture, such as not greater than 95 wt. %, not greater than 90 wt. %, or not greater than 85 wt. % for the total weight of the mixture. Moreover, the mixture may include the ceramic material in a content including any of the minimum and maximum percentages noted herein.

In an embodiment, the mixture may further include a solvent, a binder material, a pore former, deflocculant, or any combination thereof to facilitate mixing and/or shaping of the mixture. In a particular embodiment, pore former, such as corks, having suitable sizes may be used to form the first type of pores. In at least one embodiment, the mixture may comprise at least one volatile component. For example, the mixture may include one or more air bubbles. In an embodiment, the mixture may be wet. For example, the mixture may be in the form of a slurry. In another embodiment, the solvent may include water.

In another embodiment, the mixture may have a particular viscosity to facilitate improved formation of the batch of refractory objects. In an aspect, the mixture may include a viscosity of at least 25,000 centipoise, such as at least 30,000 centipoise, at least 35,000 centipoise, at least 40,000 centipoise, at least 45,000 centipoise, or at least 50,000 centipoise. In another aspect, the mixture may comprise a viscosity of not greater than 60,000 centipoise, not greater than 55,000 centipoise, not greater than 50,000 centipoise, not greater than 45,000 centipoise, or not greater than 40,000 centipoise. Moreover, the mixture may include a viscosity in a range including any of the minimum and maximum values noted herein.

In an embodiment, forming the mixture may comprise reducing a pressure on the mixture to remove gases in the mixture. In a particular embodiment, mixing may comprise applying vacuum to the mixture. In another particular embodiment, the mixture of raw materials may be placed in a particular mixing container prior to the application of vacuum. In an aspect, the mixing container may comprise a substantially cylindrical upper portion and a funnel portion extending from the substantially cylindrical upper portion. Referring to FIGS. 5A-5B, a mixing container of an embodiment is illustrated.

FIG. 5A includes a top view of the mixing container 500. FIG. 5B includes an illustration of the cross-section A-A. As illustrated, the mixing container 500 may include a cylindrical upper portion 510 connected to a funnel portion 520. In another aspect, the mixing container may comprise a lid.

In a particular implementation, the mixing container containing the mixture may be placed under vacuum to facilitate application of a reduced pressure to the mixture. In an embodiment, the vacuum pressure may be carefully controlled to facilitate improved formation and/or property and/or performance of the batch of refractory objects. In another embodiment, the process 400 may include applying a particular pressure that may facilitate improved formation and/or property and/or performance of the batch of refractory objects. In an aspect, the pressure may be sufficient to remove gases from the mixture. In another aspect, the pressure may be sufficient to mix the mixture. In a particular aspect, the pressure may be sufficient to induce a mixing or rolling action in the mixture. In another particular aspect, the pressure may be sufficient to cause water in the mixture to boil. In still another aspect, the pressure may be sufficient to keep a homogenous distribution of the pore formers and to remove gases from the mixture. In a more particular aspect, the mixture may be mixed under a vacuum at 28 in-Hg to not greater than 30 in-Hg.

In an embodiment, the process 400 may include mixing the mixture under vacuum for a particular time period that may facilitate improved formation and/or property and/or performance of the batch of refractory objects. In a particular aspect, the mixture may be kept under vacuum for not greater than 10 minutes, such as not greater than 9 minutes, not greater than 8 minutes, not greater than 7 minutes, not greater than 6 minutes, not greater than 5 minutes, or not greater than 4 minutes. In a particular aspect, the mixture may be kept under vacuum for at least 1 minute, at least 2 minutes, at least 3 minutes, at least 4 minutes, or at least 5 minutes. Moreover, the mixing under a vacuum may be performed for a time including in a range including any of the minimum and maximum values noted herein.

The process 500 may continue to block 404 to form a green body from the mixture. In an embodiment, the process 500 may comprise transferring the mixture to a shaping device. In a particular embodiment, transferring the mixture may be facilitated by a particular pouring apparatus. Referring to FIG. 5B, a pouring apparatus 530 is connected to the funnel portion of the mixing container 520. In an embodiment, the pouring apparatus 530 may comprise a valve 532 disposed adjacent to the funnel portion of the mixing container 520. As illustrated, the valve 520 may be disposed closer to the mixing container than to an open end 534 of the pouring apparatus 530. In an embodiment, the valve 532 may be configured to selectively start and stop the flow of the mixture through the pouring apparatus 530.

As illustrated, the pouring apparatus 530 may comprise a substantially constant diameter, d. In another embodiment, the pouring apparatus may be tapered. For example, the taper angle of the pouring apparatus may be less than a taper angle of the funnel portion 520.

In an embodiment, the pouring apparatus 530 may be in the form of a hose. In an aspect, the pouring apparatus may include a flexible hose. In a further aspect, the pouring apparatus may include a rigid tube. In a particular embodiment, the mixing container and the pouring apparatus may be integrated to form a unitary refractory object forming apparatus.

In an embodiment, the process 400 may include extending the pouring apparatus into a cavity of a shaping device, such as a mold, to facilitate transferring of the mixture. In particular embodiment, the pouring apparatus may protrude into the mold cavity by at least 50%, at least 55%, at least 60%, at least 65%, at least 70%, at least 75%, at least 80%, at least 85%, at least 90%, or at least 95% of total height of mold cavity. In another embodiment, transferring of the mixture may be started after the pouring apparatus is extended into the cavity of the shaping device. For instance, the valve 532 may be opened to allow the mixture to flow into the cavity. In a particular embodiment, transferring the mixture may include raising the pouring apparatus to keep the open end of the pouring apparatus close to the mixture surface. In a further embodiment, the valve may be closed as the transfer of the mixture is finished. In a further embodiment, a plurality of shaping devices may be used to facilitate formation of a batch of green bodies. In an embodiment, forming a green body from the mixture may include molding, pressing, heating, or the like, or any combination thereof.

The process 400 may continue to block 406 to form a refractory object including a finally formed body. In an embodiment, the green body may be heated to burn out the pore former to form the first type of pores. In a further embodiment, heating may be performed at a sintering temperature of the green body. In another embodiment, the process 400 may include sintering the green body at a temperature of at least 1300° C., at least 1500° C., at least 1800° C., at least 2000° C. Additionally or alternatively, the sintering temperature may be not greater than 2600° C., such as not greater than 2300° C., not greater than 2200° C., not greater than 2100° C., not greater than 2000° C., not greater than 1900° C., not greater than 1800° C., not greater than 1700° C., not greater than 1600° C., or not greater than 1500° C. Moreover, sintering may be performed at a temperature in a range including any of the minimum and maximum values noted herein.

In another embodiment, the green body may be sintered for at least 2 hours, at least 4 hours, at least 6 hours, at least 8 hours, or at least 10 hours. Additionally or alternatively, the green body may be sintered for not greater than 48 hours, not greater than 36 hours, not greater than 24 hours, or not greater than 12 hours. Moreover, sintering may be performed for a time period in a range including any of the minimum and maximum values noted herein.

In a further embodiment, the process 400 may include forming the batch of refractory objects having the finally formed bodies, wherein each body may be formed as described in embodiments herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A batch of refractory objects, comprising:
a plurality of bodies, each body of the plurality of bodies comprising a ceramic,
wherein the batch comprises an average porosity of at least 25% to not greater than 75% for a volume of the batch,
wherein the batch comprises at least 50 refractory objects, a minimum volume of at least 0.36 cubic meters, and an average batch Porosity Index of not greater than 7.

Embodiment 2. The batch of refractory objects of embodiment 1, wherein the batch comprises the average batch Porosity Index of not greater than 6, not greater than 5, not greater than 4, not greater than 3, not greater than 2, not greater than 1, not greater than 0.7, not greater than 0.5, not greater than 0.3, or not greater than 0.1.

Embodiment 3. The batch of refractory objects of any one of embodiments 1 to 2, wherein the batch or each body of the plurality of bodies comprises an average porosity of at least 25%, at least 30%, at least 35%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 60%, at least 65%, or at least 70% for a total volume of the batch.

Embodiment 4. The batch of refractory objects of any one of embodiments 1 to 3, wherein the batch or each body of the plurality of bodies comprises an average porosity of not greater than 75%, not greater than 70%, not greater than 65%, not greater than 64%, not greater than 63%, not greater than 62%, not greater than 61%, not greater than 60%, not greater than 59%, not greater than 58%, not greater than 57%, not greater than 56%, not greater than 55%, not greater than 54%, not greater than 53%, not greater than 52%, not greater than 51%, not greater than 50%, not greater than 45%, not greater than 40%, not greater than 35%, or not greater than 30% for the volume of the batch.

Embodiment 5. The batch of refractory objects of any one of embodiments 1 to 4, wherein each body comprises a first pore type, wherein the first pore type comprises an irregular angular shape.

Embodiment 6. The batch of refractory objects of embodiment 5, wherein the first pore type comprises a homogeneous distribution.

Embodiment 7. The batch of refractory objects of any one of embodiments 5 to 6, wherein the batch comprises an average content of the first pore type of at least 23 vol %, at least 25 vol %, at least 27 vol %, at least 30 vol %, at least 32 vol %, at least 35 vol %, or at least 37 vol % for the volume of the batch; and/or wherein the batch comprises the average content of the first pore type of not greater than 41 vol % % for the volume of the batch, not greater than 39 vol %, not greater than 37 vol %, not greater than 35 vol %, not greater than 33 vol %, or not greater than 31 vol % for the volume of the batch.

Embodiment 8. The batch of refractory objects of any one of embodiments 5 to 7, wherein the body may include a second pore type, wherein the second pore type comprises a homogeneous distribution, and wherein the second pore type comprises a regular or irregular shape.

Embodiment 9. The batch of refractory objects of any one of embodiments 5 to 8, wherein the batch comprises an average content of the second pore type of at least 12 vol %, at least 15 vol %, at least 17 vol %, at least 20 vol %, or at least 22 vol % for the volume of the batch; and/or wherein the batch comprises the average content of the second pore type of not greater than 26 vol % % for the volume of the batch, not greater than 26 vol %, not greater than 24 vol %, not greater than 22 vol %, not greater than 20 vol %, not greater than 18 vol %, or not greater than 16 vol % for the volume of the batch.

Embodiment 10. The batch of refractory objects of any one of embodiments 5 to 9, wherein the first pore type comprises a greater portion of the porosity than the second pore type.

Embodiment 11. The batch of refractory objects of any one of embodiments 5 to 10, wherein the first pore type comprises at least 40%, at least 44%, at least 47%, at least 50%, at least 52%, at least 55%, at least 57%, at least 59%, at least 61%, at least 64%, at least 66%, at least 68%, at least 70%, or at least 73% of the total porosity of the batch; and/or wherein the first pore type comprises not greater than 79%, not greater than 77%, not greater than 74%, not greater than 71%, not greater than 68%, not greater than 66%, not greater than 64%, not greater than 61%, not greater than 58%, not greater than 54%, not greater than 51%, not greater than 49%, not greater than 47%, or not greater than 45% of the total porosity of the batch.

Embodiment 12. The batch of refractory objects of any one of embodiments 1 to 11, wherein the second pore type comprises not greater than 45%, not greater than 43%, not greater than 41%, not greater than 38%, not greater than 35%, not greater than 33%, not greater than 31%, not greater than 28%, not greater than 26%, not greater than 23%, not greater than 21%, not greater than 19%, not greater than 15% of the total porosity of the batch; and/or wherein the second pore type comprises at least 24%, at least at least 27%, at least 30%, at least 32%, at least 35%, at least 37%, at least 39%, or at least 41% of the total porosity of the batch.

Embodiment 13. The batch of refractory objects of any one of embodiments 5 to 12, further comprising a third pore type, wherein the third pore type comprises a nonhomogeneous distribution, and wherein the third pore type comprises a regular or rounded shape.

Embodiment 14. The batch of refractory objects of embodiment 13, wherein the batch comprises an average content of the third pore type of less than 5 vol % % for the volume of the batch, not greater than 4 vol %, not greater than 3 vol %, not greater than 2 vol %, not greater than 1 vol %, not greater than 0.7 vol %, not greater than 0.5%, not greater than 0.2 vol %, or not greater than 0.1 vol % for the volume of the batch; and/or wherein the batch comprise the average content of the third pore type of at least 0.005 vol %, at least 0.01 vol %, at least 0.05 vol %, at least 0.08 vol %, at least 0.1 vol %, at least 0.3 vol %, at least 0.5 vol %, at least 0.7 vol %, at least 0.9 vol %, at least 1 vol %, at least 1.3 vol %, at least 1.5 vol %, at least 1.8 vol %, at least 2 vol %, at least 3 vol %, at least 4 vol %, at least 4.2 vol %, or at least 4.6 vol % for the volume of the batch.

Embodiment 15. The batch of refractory objects of any one of embodiments 13 to 14, wherein the third pore type comprises not greater than 8%, not greater than 7%, not greater than 6%, not greater than 5%, not greater than 4%, not greater than 3%, not greater than 2%, not greater than 1%, not greater than 0.8%, not greater than 0.5%, not greater than 0.2%, or not greater than 0.1% of the total porosity of the batch.

Embodiment 16. The batch of refractory objects of any one of embodiments 13 to 15, wherein the third pore type is used to calculate the Porosity Index.

Embodiment 17. The batch of refractory objects of any one of embodiments 13 to 16, wherein the Porosity Index is defined as [1×(number of pores of the third pore type having a pore size greater than 3 mm and not greater than or equal to 5 mm)+5×(number of pores of the third pore type having a pore size greater than 5 mm and not greater than or equal to 6.5 mm)+10×(number of pores of the third pore type having a pore size greater than 6.5 mm)] for the body.

Embodiment 18. The batch of refractory objects of any one of embodiments 5 to 17, wherein the first pore type comprises an average maximum dimension of at least 0.01 mm, at least 0.03 mm, at least 0.05 mm, at least 0.08 mm, at least 0.1 mm, at least 0.2 mm, at least 0.3 mm, at least 0.5 mm, at least 0.7 mm, at least 0.9 mm, at least 1.1 mm, at least 1.3 mm, at least 1.5 mm, at least 1.7 mm, or at least 1.9 mm.

Embodiment 19. The batch of refractory objects of any one of embodiments 5 to 18, wherein the first pore type comprises the average maximum dimension of less than 3 mm, less than 2.5 mm, less than 2 mm, not greater than 1.8 mm, not greater than 1.6 mm, not greater than 1.4 mm, not greater than 1.2, not greater than 1 mm, not greater than 800 microns, not greater than 650 microns, not greater than 500 microns, not greater than 380 microns, not greater than 250 microns, not greater than 125 microns, not greater than 100 microns, not greater than 75 microns, not greater than 50 microns, not greater than 25 microns, or not greater than 10 microns.

Embodiment 20. The batch of refractory objects of any one of embodiments 13 to 19, wherein the third pore type comprises an average maximum dimension of at least 3 mm or greater than 3, wherein the third pore type comprises the average maximum dimension of at least 3.2 mm, at least 3.5 mm, at least 3.8 mm, at least 4.1 mm, at least 4.4 mm, at least 4.7 mm, at least 5 mm, at least 5.3 mm, at least 5.5 mm, at least 5.9 mm, at least 6.2 mm, at least 6.5 mm, at least 6.8 mm, or at least 7.1 mm.

Embodiment 21. The batch of refractory objects of any one of embodiments 13 to 20, wherein the third pore type comprises the maximum dimension of not greater 15 mm, not greater than 12 mm, not greater than 10 mm, not greater than 9 mm, not greater than 8.5 mm, not greater than 8 mm, not greater than 7.5 mm, not greater than 7.1 mm, not greater than 6.8 mm, not greater than 6.5 mm, not greater than 6.3 mm, not greater than 6.1 mm, not greater than 5.8 mm, not greater than 5.4 mm, not greater than 5.1 mm, or not greater than 4.8 mm.

Embodiment 22. The batch of refractory objects of any one of embodiments 1 to 21, wherein at least 95%, at least 96%, at least 97%, at least 98%, at least 99%, or 100% of the total porosity of the batch comprises pores having an average maximum dimension of not greater than 6.5 millimeters; wherein at least 90%, at least 91%, at least 92%, at least 93%, at least 94%, at least 95%, at least 96%, at least 97%, at least 98%, at least 99%, or 100% of the total porosity of the batch comprises pores having the average maximum dimension of not greater than 5 millimeters, and/or wherein at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of the total porosity of the batch comprises pores having the average maximum dimension of less than 3 millimeters or at most 2 millimeters.

Embodiment 23. The batch of refractory objects of any one of embodiments 1 to 22, wherein each body of the plurality of bodies comprises a crystalline phase, a vitreous phase, or a combination thereof.

Embodiment 24. The batch of refractory objects of any one of embodiments 1 to 23, wherein each body of the plurality of bodies comprises an oxide, a nitride, a carbide, or any combination thereof.

Embodiment 25. The batch of refractory objects of any one of embodiments 1 to 24, wherein each body of the plurality of bodies comprises zirconium oxide, zircon, silica, alumina, titania, chromia, tin oxide, or any combination thereof.

Embodiment 26. The batch of refractory objects of any one of embodiments 1 to 25, wherein the batch comprises an average content of oxide of at least 60 wt. %, at least 65 wt. %, at least 70 wt. %, at least 75 wt. %, at least 80 wt. %, at least 85 wt. %, at least 90 wt. %, or at least 95 wt. % for a weight of the batch; and/or wherein each body of the plurality of bodies comprises at least 60 wt. %, at least 65 wt. %, at least 70 wt. %, at least 75 wt. %, at least 80 wt. %, at least 85 wt. %, at least 90 wt. %, or at least 95 wt. % of oxide for a weight of the body.

Embodiment 27. The batch of refractory objects of any one of embodiments 1 to 26, wherein each body of the plurality of bodies comprises zircon in a crystalline phase.

Embodiment 28. The batch of refractory objects of any one of embodiments 1 to 27, wherein the batch comprises an average content of zircon of at least 60 wt. %, at least 65 wt. %, at least 70 wt. %, at least 75 wt. %, at least 80 wt. %, at least 85 wt. %, at least 90 wt. %, or at least 95 wt. % for a weight of the batch; and/or wherein each body of the plurality of bodies comprises at least 60 wt. %, at least 65 wt. %, at least 70 wt. %, at least 75 wt. %, at least 80 wt. %, at least 85 wt. %, at least 90 wt. %, or at least 95 wt. % of zircon for a weight of the body.

Embodiment 29. The batch of refractory objects of any one of embodiments 1 to 28, wherein the batch comprises an average density of at least 1.70 grams per cubic centimeter (g/cc), at least 1.75 g/cc, at least 1.80 g/cc, at least 1.85 g/cc, at least 1.90 g/cc, at least 1.95 g/cc, at least 2.00 g/cc, at least 2.05 g/cc, at least 2.10 g/cc, at least 2.15 g/cc, at least 2.20 g/cc, at least 2.25 g/cc, at least 2.30 g/cc, at least 2.35 g/cc, at least 2.40 g/cc, at least 2.45 g/cc, or at least 2.50 g/cc.

Embodiment 30. The batch of refractory objects of any one of embodiments 1 to 29, wherein the batch comprises an average density of not greater than 2.75 grams per cubic centimeter (g/cc), not greater than 2.70 g/cc, not greater than 2.65 g/cc, not greater than 2.60 g/cc, not greater than 2.55 g/cc, not greater than 2.50 g/cc, not greater than 2.45 g/cc, not greater than 2.40 g/cc, not greater than 2.35 g/cc, not greater than 2.30 g/cc, not greater than 2.25 g/cc, not greater than 2.20 g/cc, not greater than 2.15 g/cc, not greater than 2.10 g/cc, not greater than 2.05 g/cc, or not greater than 2.00 g/cc.

Embodiment 31. The batch of refractory objects of any one of embodiments 1 to 30, wherein the batch comprises an average modulus of rupture of at least 20 Gpa, at least 25 Gpa, at least 26 Gpa, at least 27 Gpa, at least 28 Gpa, at least 29 Gpa, at least 30 Gpa, at least 31 Gpa, at least 32 Gpa, at least 33 Gpa, at least 34 Gpa, at least 35 Gpa, or at least 36 Gpa.

Embodiment 32. The batch of refractory objects of any one of embodiments 1 to 31, wherein the batch comprises an average modulus of rupture of not greater than 40 Gpa, not greater than 35 Gpa, not greater than 34 Gpa, not greater than 33 Gpa, not greater than 32 Gpa, not greater than 31 Gpa, not greater than 30 Gpa, not greater than 29 Gpa, not greater than 28 Gpa, not greater than 27 Gpa, not greater than 26 Gpa, or not greater than 25 Gpa.

Embodiment 33. The batch of refractory objects of any one of embodiments 1 to 32, wherein the batch comprises an average modulus of rupture of at least 10.5 Mpa, at least 10.6 Mpa, at least 10.7 Mpa, at least 10.8 Mpa, at least 10.9 Mpa, at least 11.0 Mpa, at least 11.1 Mpa, at least 11.2 Mpa, at least 11.3 Mpa, at least 11.4 Mpa, at least 11.5 Mpa, at least 11.6 Mpa, at least 11.7 Mpa, at least 11.8 Mpa, at least 11.9 Mpa, at least 12.0 Mpa, at least 12.1 Mpa, at least 12.2 Mpa, at least 12.3 Mpa, at least 12.4 Mpa, at least 12.5 Mpa, or at least 12.6 Mpa.

Embodiment 34. The batch of refractory objects of any one of embodiments 1 to 33, wherein the batch comprises an average modulus of rupture of not greater than 13.5 Mpa, not greater than 13.4 Mpa, not greater than 13.3 Mpa, not greater than 13.2 Mpa, not greater than 13.1 Mpa, not greater than 13.0 Mpa, not greater than 12.9 Mpa, not greater than 12.8 Mpa, not greater than 12.7 Mpa, not greater than 12.6 Mpa, not greater than 12.5 Mpa, not greater than 12.4 Mpa, not greater than 12.3 Mpa, not greater than 12.2 Mpa, not greater than 12.1 Mpa, or not greater than 12.0 Mpa.

Embodiment 35. The batch of refractory objects of any one of embodiments 1 to 34, wherein the batch comprises at least 50 refractory objects, at least 60, at least 65, at least 70, at least 80, at least 90, at least 100, at least 200, at least 300, at least 400, at least 500, at least 600, at least 700, at least 800, at least 900, or at least 1000 different refractory objects.

Embodiment 36. The batch of refractory objects of any one of embodiments 1 to 35, wherein each of the plurality of bodies comprises a length of at least 10 cm, at least 15 cm, at least 20 cm, at least 25 cm, at least 30 cm, at least 35 cm, or at least 40 cm.

Embodiment 37. The batch of refractory objects of any one of embodiments 1 to 36, wherein each of the plurality of bodies comprises a width of at least 5 cm, at least 7 cm, at least 9 cm, at least 11 cm, at least 13 cm, or at least 15 cm.

Embodiment 38. The batch of refractory objects of any one of embodiments 1 to 37, wherein each of the plurality of bodies comprises a thickness of at least 1 cm, at least 2 cm, at least 4 cm, at least 6 cm, at least 8 cm, or at least 10 cm.

Embodiment 39. The batch of refractory objects of any one of embodiments 1 to 38, wherein each of the plurality of bodies comprises a volume of at least 3.6 cubic decimeters, at least 5.4 cubic decimeters, at least 7.2 cubic decimeters, at least 8.0 cubic decimeters, or at least 9.8 cubic decimeters; and/or wherein each of the plurality of bodies comprises a volume of not greater than 36 cubic decimeters, not greater than 24 cubic decimeters, not greater than 16 cubic decimeters, not greater than 11 cubic decimeters, not greater than 7 cubic decimeters, or not greater than 4 cubic decimeters.

Embodiment 40. The batch of refractory objects of any one of embodiments 1 to 39, wherein a volume of the batch is at least 0.36 cubic meters, at least 0.40 cubic meters, at least 0.45 cubic meters, at least 1 cubic meter, at least 1.15 cubic meters, at least 1.25 cubic meters, at least 1.35 cubic meters, at least 1.45 cubic meters, or at least 1.55 cubic meters.

Embodiment 41. The batch of refractory objects of any one of embodiments 1 to 40, wherein a volume of the batch is not greater than 200 cubic meters, not greater than 150 cubic meters, not greater than 100 cubic meters, not greater than 80 cubic meters, not greater than 50 cubic meters, not greater than 30 cubic meters, not greater than 10 cubic meters, not greater than 5 cubic meters, not greater than 3 cubic meters, not greater than 1 cubic meters, or not greater than 0.6 cubic meters.

Embodiment 42. A ceramic liner, comprising at least one batch of the batch of refractory objects of any one of embodiments 1 to 40, wherein the ceramic liner is configured to be in contact with molten glass.

Embodiment 43. An equipment, comprising an inner wall defining a cavity of the equipment, wherein the ceramic liner of embodiment 41 is disposed overlying at least a portion of the inner wall, wherein the equipment is configured to operate at a temperature of at least 1500° C., at least 1700° C., at least 1900° C., or at least 2200° C., wherein the equipment comprises a furnace, a reactor, or any combination thereof.

Embodiment 44. A method of forming a refractory object, comprising: forming a mixture including a ceramic material, an amorphous material, or a combination thereof, wherein forming the mixture comprises reducing a pressure on the mixture to remove gases in the mixture and sufficient to mix the mixture; and forming the mixture into a body of the refractory object.

Embodiment 45. The method of embodiment 44, wherein the ceramic material comprises an oxide, a nitride, a carbide, or any combination thereof.

Embodiment 46. The method of any one of embodiments 44 to 45, wherein the ceramic material comprises zirconium oxide, zircon, alumina, titania, chromia, tin oxide, silica, or any combination thereof.

Embodiment 47. The method of any one of embodiments 44 to 46, wherein the mixture comprises at least 40 wt. % of the ceramic material for a total weight of the mixture, at least 45 wt. %, at least 55 wt. %, at least 60 wt. %, at least 65 wt. %, at least 70 wt. %, at least 75 wt. %, at least 80 wt. %, at least 85 wt. %, or at least 90 wt. % for a total weight of the mixture.

Embodiment 48. The method of any one of embodiments 44 to 47, wherein the mixture comprises at least one volatile component.

Embodiment 49. The method of any one of embodiments 44 to 48, wherein the mixture further comprises a solvent, a binder material, a pore former, deflocculant, or any combination thereof.

Embodiment 50. The method of any one of embodiments 44 to 49, wherein the mixture comprises a viscosity of at least 25,000 centipoise, at least 30,000 centipoise, at least 35,000 centipoise, at least 40,000 centipoise, at least 45,000 centipoise, or at least 50,000 centipoise.

Embodiment 51. The method of any one of embodiments 44 to 50, wherein the mixture comprises a viscosity of not greater than 60,000 centipoise, not greater than 55,000 centipoise, not greater than 50,000 centipoise, not greater than 45,000 centipoise, or not greater than 40,000 centipoise.

Embodiment 52. The method of any one of embodiments 44 to 51, wherein mixing the mixture is accomplished without vibration of the mixing container, mechanical stimulation of the mixture, or any combination thereof.

Embodiment 53. The method of any one of embodiments 44 to 52, wherein reducing the pressure on the mixture induces a mixing or rolling action in the mixture.

Embodiment 54. The method of any one of embodiments 44 to 53, wherein the mixture is mixed under a vacuum at 28 in-Hg to not greater than 30 in-Hg for at least 1 minute, at least 2 minutes, at least 3 minutes, at least 4 minutes, or at least 5 minutes.

Embodiment 55. The method of any one of embodiments 44 to 54, wherein the mixture is mixed under a vacuum of at 28 in-Hg to not greater than 30 in-Hg for not greater than 10 minutes, not greater than 9 minutes, not greater than 8 minutes, not greater than 7 minutes, not greater than 6 minutes, not greater than 5 minutes, or not greater than 4 minutes.

Embodiment 56. The method of any one of embodiments 44 to 55, further comprising forming a green body from the mixture and sintering the green body to form the body of the refractory object, wherein sintering is at a temperature of at least 1300° C., at least 1500° C., at least 1800° C., at least 2000° C.; and/or wherein forming the body of the refractory object comprises sintering at a temperature of not greater than 2600° C.

Embodiment 57. The method of any one of embodiments 44 to 56, wherein the green body is sintered for at least 2 hours, at least 4 hours, at least 6 hours, at least 8 hours, or at least 10 hours; and/or wherein the green body is sintered for not greater than 48 hours, not greater than 36 hours, not greater than 24 hours, or not greater than 12 hours.

Embodiment 58. A method of forming a batch of refractory objects, comprising performing any one of the method of embodiments 44 to 57.

Embodiment 59. The method of embodiment 58, wherein the batch comprises at least 50 different refractory objects, at least 60, at least 65, at least 70, at least 80, at least 90, at least 100, at least 200, at least 300, at least 400, at least 500, at least 600, at least 700, at least 800, at least 900, or at least 1000 different refractory objects.

Embodiment 60. The method of any one of embodiments 44 to 59, wherein the mixture is in a form of a slurry.

EXAMPLES

Example 1

A representative batch of zircon bricks, S1, and another batch of zircon bricks, CS2, are formed. Mixture 1 for forming Batch S1 includes the same materials as Mixture 2 for forming Batch S2. The same amounts of the raw materials are used to form Mixtures 1 and 2. The raw materials include a binder solution including water, sodium silicate, and sodium alginate, cork, and zircon flour. The raw materials are first mixed in a Hobart bowl for both mixtures. Mixture 1 is then transferred into a mixing container as illustrated in FIGS. 5A and 5B and further mixed at the vacuum level of 28 in-Hg to 30 in-Hg for 3 minutes. During the mixing, rolling action of the mixture and water boiling can be observed. The mixing container is removed from the vacuum and Mixture 1 is transferred into a mold through the pouring apparatus as illustrated in FIG. 5B. The pouring apparatus is extended to the bottom of the mold cavity at the beginning of transfer and raised slowly during the transfer such that the open end of the pouring apparatus is just visible above the mixture surface as the mold cavity fills. 50 molds are filled in the same manner.

Referring to FIG. 6, air bubbles 610 can be observed at the surface of the mixture 600 in the Hobart bowl. The image of FIG. 6 is representative of the standard mixing process in a Hobart bowl.

Mixture 2 is directly poured into 50 molds from the Hobart bowl with care taken to remove as many air bubbles as possible.

The bodies may be dried and sintered for 6 hours at 1300 to 1800° C. Each batch has the volume of approximately 0.36 cubic meters.

The finally formed bodies are cut and cut surfaces are analyzed for calculating Porosity Index as described in embodiments herein. Each cut surface measures approximately 30 cm in length and 15 cm in width. The average PI of Batch S1 was 0.3; while the average PI of Batch CS2 was 7.4.

Referring to FIGS. 7A and 7B, SEM images of fractured surfaces of Batch CS2 at different magnifications are included. The fractured surfaces include the third type of pores 702 having pore sizes of greater than 3 mm, formed due the presence of air bubbles in the mixture. The fractured surfaces also include the first type of pores 701 formed by using the pore former, and the second type of pores 703 formed by spaces between grains.

Figures 8A, 8B:
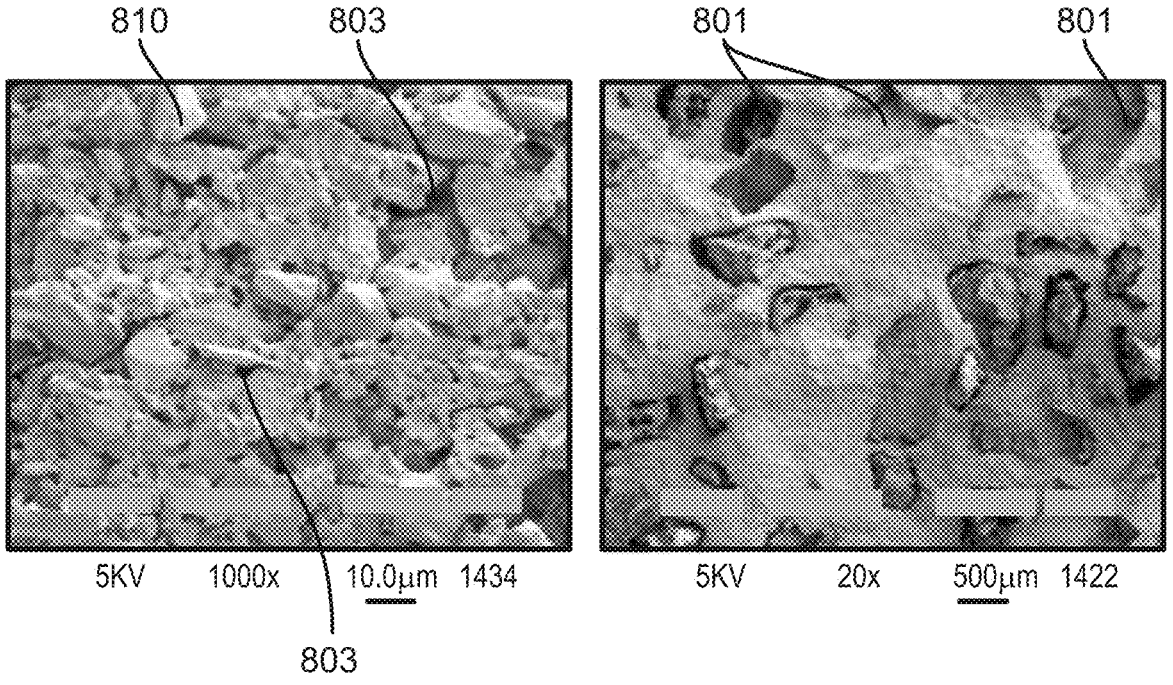
FIGS. 8A and 8B include SEM images of fractured surfaces of refractory objects in accordance with embodiments herein.

Referring to FIGS. 8A and 8B, SEM images of fractured surfaces of Batch S1 at different magnifications are included. The fractured surfaces include grains 810, the second type of pores 803 formed by spaces between the grains 810. The fractured surfaces also include the first type of pores 801. The third type of pores formed due to the presence of air bubbles are not observed.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A batch of refractory objects, comprising:

a plurality of bodies, each body of the plurality of bodies comprising a ceramic, a first pore type of at least 23 vol % and not greater than 41 vol % for the volume of the batch, wherein an average maximum dimension of the first pore type is at least 0.1 mm and less than 2 mm; and a second pore type comprising an average maximum pore dimension not greater than 60% of the average maximum pore dimension of the first pore type, wherein the batch comprises an average porosity of at least 25% to not greater than 75% for the volume of the batch, wherein the batch comprises at least 50 refractory objects, a minimum volume of at least 0.36 cubic meters, and an average batch Porosity Index of not greater than 7.

2. The batch of refractory objects of claim 1, wherein Porosity Index is defined as [1×(number of pores of a pore size greater than 3 mm and not greater than or equal to 5 mm)+5×(number of pores having a pore size greater than 5 mm and not greater than or equal to 6.5 mm)+10×(number of pores having a pore size greater than 6.5 mm)] for each body of the plurality of bodies.

3. The batch of refractory objects of claim 1, wherein the first pore type comprises at least 40% and not greater than 79% of a total porosity (vol %) of the batch.

4. The batch of refractory objects of claim 1, comprising an average content of a third pore type of less than 5 vol %, wherein pores of the third pore type comprises an average maximum dimension of at least 3 mm and not greater 15 mm.

5. The batch of refractory objects of claim 3, comprising an average content of the second pore type of at least 12 vol % and not greater than 26 vol %.

6. The batch of refractory objects of claim 2, wherein each body of the plurality of bodies comprises an oxide, a nitride, a carbide, or any combination thereof.

7. The batch of refractory objects of claim 1, wherein each body of the plurality of bodies comprises zircon, wherein the batch comprises an average content of zircon of at least 60 wt. % for a weight of the batch.

8. The batch of refractory objects of claim 1, wherein each body of the plurality of bodies comprises a length of at least 10 cm, a width of at least 5 cm, a thickness of at least 1 cm, or a combination thereof.

9. The batch of refractory objects of claim 1, wherein the first pore type comprises an irregular angular shape.

10. A method of forming a batch of refractory objects, comprising:

forming a mixture including a ceramic material, an amorphous material, or a combination thereof, wherein forming the mixture comprises reducing a pressure on the mixture to remove gases in the mixture, wherein reducing the pressure on the mixture induces a mixing or rolling action in the mixture; and forming the mixture into a plurality of bodies of the refractory objects including a ceramic, wherein the batch comprises a first pore type of at least 23 vol % and not greater than 41 vol % for the volume of the batch, wherein an average maximum dimension of the first pore type is at least 0.1 mm and less than 2 mm; and a second pore comprising an average maximum pore dimension not greater than 60% of the average maximum pore dimension of the first pore type, wherein the batch comprises an average porosity of at least 25% to not greater than 75% for the volume of the batch, and wherein the batch comprises at least 50 refractory objects, a minimum volume of at least 0.36 cubic meters, and an average batch Porosity Index of not greater than 7.

11. The method of claim 10, wherein the mixture comprises at least one volatile component.

12. The method of claim 10, wherein the mixture comprises a viscosity of at least 25,000 centipoise and not greater than 60,000 centipoise.

13. The method of claim 10, wherein the mixture is mixed under a vacuum at 28 in-Hg to not greater than 30 in-Hg, and the mixture is mixed for not greater than 10 minutes.

14. A batch of refractory objects, comprising a plurality of bodies, each body of the plurality of bodies comprising a ceramic, wherein:

the plurality of bodies comprises zircon;

the batch comprises an average porosity of at least 25% to not greater than 75% for a volume of the batch, a first pore type comprises an average maximum dimension of at least 0.1 mm and less than 2 mm and comprises an irregular angular shape, wherein the first pore type is at least 40% and not greater than 79% of a total porosity (vol %) of the batch and the first pore type is at least 23 vol % and not greater than 41 vol % for the volume of the batch; and the batch comprises at least 50 refractory objects, a minimum volume of at least 0.36 cubic meters, and an average batch Porosity Index of not greater than 7, wherein Porosity Index is defined as [1×(number of pores of a pore size greater than 3 mm and not greater than or equal to 5 mm)+5×(number of pores having a pore size greater than 5 mm and not greater than or equal to 6.5 mm)+10×(number of pores having a pore size greater than 6.5 mm)] for each body of the plurality of bodies.

15. The batch of refractory objects of claim 14, comprising a second pore type, wherein the second pore type is not greater than 41% of the total porosity (vol %) of the batch.

16. The batch of refractory objects of claim 14, comprising a second pore type comprising an average maximum pore dimension not greater than 60% of the average maximum pore dimension of the first pore type.

\* \* \* \* \*